A. GILLIS.
COLD WATER SQUIRT.
APPLICATION FILED JULY 17, 1914.

1,220,218. Patented Mar. 27, 1917.

Witnesses:
M. Morel
J. Frendenroll

Inventor
Alfred Gillis
By his Attorneys
Prindle Wright Small

UNITED STATES PATENT OFFICE.

ALFRED GILLIS, OF BALTIMORE, MARYLAND.

COLD-WATER SQUIRT.

1,220,218. Specification of Letters Patent. Patented Mar. 27, 1917.

Application filed July 17, 1914. Serial No. 851,455.

*To all whom it may concern:*

Be it known that I, ALFRED GILLIS, of Baltimore, in the State of Maryland, have invented a certain new and useful Improvement in Cold-Water Squirts, and do hereby declare that the following is a full, clear, and exact description thereof.

My invention relates particularly to devices for providing a stream of cold water for sprinkling the coal, etc., used in connection with a locomotive, although it is equally applicable to other similar purposes.

Hitherto in order to provide a stream of water for this purpose, it has been customary to attach a hose to the boiler. An apparatus of this kind has been found very undesirable, and in fact, even dangerous owing to the blowing off of the hose and the scalding and burning of the firemen. The use of hot water for this purpose is generally disadvantageous as the hot water issuing from the hose may scald the firemen.

The object of my invention is to provide an apparatus for use on locomotives and in any similar locations, in which a stream of cold water may be readily provided in a simple manner and without any danger of scalding the firemen or other persons using the stream of water.

Figure 1:
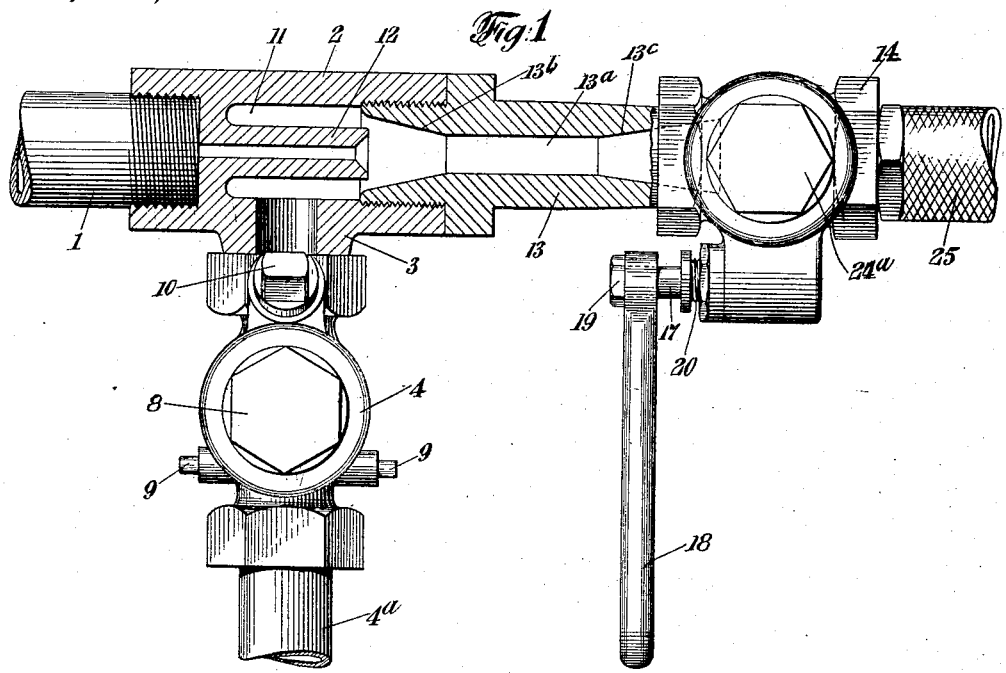
Figure 2:
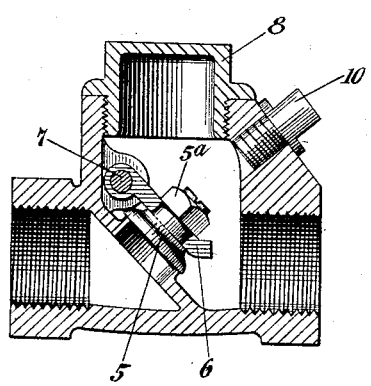
Figure 3:
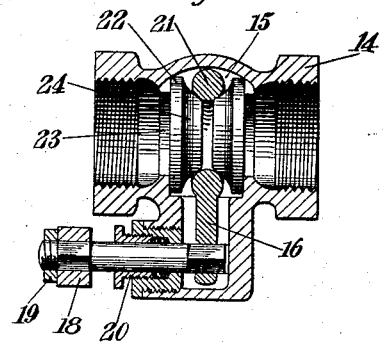

While my invention is capable of embodiment in many different forms for the purpose of illustration I have shown only one form thereof in the accompanying drawings, in which, Figure 1 is a horizontal section of an apparatus made in accordance with my invention; Fig. 2 is a central longitudinal section through the check valve shown in Fig. 1; and Fig. 3 is a longitudinal section through the quick-opening valve shown in Fig. 1.

In the drawings, I have shown a supply pipe 1 for steam which is screw-threaded to a pipe joint 2 having on one side thereof a branch inlet 3 for cold water to which is attached a check valve casing 4 communicating with a water inlet pipe $4^a$. The check valve casing 4 has in its interior a check valve 5, which is loosely supported upon a swinging arm 6, by means of a nut $5^a$, the swinging arm being supported in pivots 7 within the casing 4. Upon the top of the casing 4 there is a removable plug 8 to give access to the check valve and upon the sides of the casing 4 there are removable plugs 9 to give access to the pivots 7 while a further plug 10 upon the top of the casing 4 is provided to permit access to the nut $5^a$ which is attached to the check valve 5. The inlet 3 opens into an annular chamber 11 in the interior of the pipe joint 2, said chamber 11 surrounding a nozzle 12, which communicates with the passageway in the steam inlet pipe 1. Connected to the outlet end of the pipe joint 2 there is a connecting pipe 13 which leads from the pipe joint 2 to a quick opening valve casing 14. The connecting pipe 13 has in its interior a reduced passageway $13^a$ connected with a tapered passageway $13^b$ at the inlet end of the connecting pipe 13 and which is connected with a tapered outlet passageway $13^c$ at the outlet end of the connecting pipe 13. In the valve casing 14 there is a transverse passageway 15, in which there is adapted to swing an arm 16 carried upon a shaft 17 to the end of which shaft there is attached a handle 18. The handle is retained in place by a nut 19 and a stuffing box 20 prevents the escape of fluids around the shaft 17. At the end of the lever 16 within the transverse passageway 15 there is a ring 21 which supports upon either face thereof a valve member 22 having a flat surface 23 and a centrally located raised portion 24, which raised portion rests within the center of the ring 21. On the valve casing 14, immediately opposite the transverse passageway 15, there is a removable plug $24^a$ to give access to the interior of the casing 14. Any suitable type of hose 25, designed for conveying cold water may be applied to the outlet end of the valve casing 14.

In the operation of the apparatus, assuming that the valves are in closed position, steam will be present in the inlet pipe 1 and in the passageway in the connecting pipe 13. When it is desired to provide a stream of cold water for the purpose of spraying the coal on a locomotive tender or for any other desired purpose, the handle 18 is moved so as to quickly and immediately open the swinging valve to which it is connected, that is to say, by moving the valve members 22 in the transverse passageway 15 so as to open communication between the inlet and outlet ends of the valve casing 14. The steam within the apparatus then immediately escapes through a hose 25 drawing with it at once the cold water through the check valve and through the branch inlet 3. Because of the quick opening of the valve, cold water is therefore immediately supplied through the hose 25, and thereafter cold water passes out continually from the end of the hose 25, thus avoiding any possibility of scalding the firemen by steam or hot water. When the supply of cold water is no longer needed, the handle 18 is again operated to close the valve and the pressure of the steam then prevents the escape of water by closing the check valve within the casing 4. If any adjustment or repair is necessary to the valves, the same can be readily made by removing the proper plug to give access to the particular valve.

While I have described my invention above in detail, I wish it to be understood that many changes may be made therein without departing from the spirit of my invention.

I claim:

1. A cold water delivery device comprising an injector, a steam pressure supply pipe connected therewith, a water supply pipe therefor, and a delivery valve device at the outlet from the injector adapted to perform the combined action of controlling the flow of steam and water into and the delivery of water from said injector.

2. A cold water delivery device comprising an injector, a steam pressure supply pipe giving at all times a free access of steam to said injector and connected therewith, a water supply pipe therefor, and a quick-acting valve device at the outlet from the injector adapted to perform the combined action of controlling the flow of steam and water into and the delivery of water from said injector.

3. A cold water delivery device comprising an injector, a steam pressure supply pipe giving at all times a free access of steam to said injector and connected therewith, a water supply pipe for said injector, a check valve in said water supply pipe opening toward said injector, and a delivery valve at the outlet from the injector which performs the combined action of controlling the flow of steam and water into and the delivery of water from said injector.

4. A cold water delivery device comprising an injector, a steam pressure supply pipe giving at all times a free access of steam to said injector and connected therewith, a water supply pipe for said injector, a check valve in said water supply pipe opening toward said injector, and a swinging delivery valve at the outlet from the injector which performs the combined action of controlling the flow of steam and water into and the delivery of water from said injector, which rotates in a plane located at right angles to the outlet pipe in which the valve is situated.

5. A cold water delivery device comprising an injector, a steam pressure supply pipe giving at all times a free access of steam to said injector and connected therewith, a water supply pipe for said injector, a swinging check valve in said water supply pipe opening toward said injector, and a delivery valve at the outlet from the injector which performs the combined action of controlling the flow of steam and water into and the delivery of water from said injector.

In testimony that I claim the foregoing I have hereunto set my hand.

ALFRED GILLIS.

Witnesses:
R. CANNIFF,
WM. H. GORDON.

Copies of this patent may be obtained for five cents each, by addressing the "Commissioner of Patents, Washington, D. C."